(12) United States Patent
Kühne et al.

(10) Patent No.: US 8,235,304 B2
(45) Date of Patent: Aug. 7, 2012

(54) CONTROL DEVICE FOR AT LEAST ONE HEATING, AIR-CONDITIONING, VENTILATION OR REFRIGERATION SYSTEM

(75) Inventors: Eva Kühne, Silkeborg (DK); Bjarne Frederiksen, Lemming (DK); Anders Oestergaard Clausen, Ry (DK)

(73) Assignee: Danfoss A/S, Nordborg (DK)

( * ) Notice: Subject to any disclaimer, the term of this patent is extended or adjusted under 35 U.S.C. 154(b) by 718 days.

(21) Appl. No.: 12/420,101

(22) Filed: Apr. 8, 2009

(65) Prior Publication Data

US 2009/0259341 A1 Oct. 15, 2009

(30) Foreign Application Priority Data

Apr. 12, 2008 (DE) .................. 10 2008 018 588

(51) Int. Cl.
*G05D 23/00* (2006.01)
*F25B 49/00* (2006.01)
*G06F 13/00* (2006.01)
(52) U.S. Cl. ................ 236/1 C; 236/51; 62/126; 710/72
(58) Field of Classification Search .................. 236/1 C, 236/51, 94; 62/125, 126, 129; 700/276; 710/62, 63, 72
See application file for complete search history.

(56) References Cited

U.S. PATENT DOCUMENTS

| | | |
|---|---|---|
| 6,990,335 B1 * | 1/2006 | Shamoon et al. ............. 455/419 |
| 2003/0121652 A1 | 7/2003 | Carey et al. |
| 2004/0193324 A1 | 9/2004 | Hoog et al. |
| 2004/0225818 A1 | 11/2004 | Han |
| 2005/0194457 A1 | 9/2005 | Dolan |
| 2006/0108979 A1 | 5/2006 | Daniel et al. |
| 2006/0217150 A1 * | 9/2006 | Chen .......................... 455/556.1 |
| 2007/0210177 A1 | 9/2007 | Karasek |
| 2009/0006677 A1 * | 1/2009 | Rofougaran .................... 710/63 |
| 2011/0158423 A1 * | 6/2011 | Regen et al. .................... 381/74 |

* cited by examiner

*Primary Examiner* — Marc Norman
(74) *Attorney, Agent, or Firm* — McCormick, Paulding & Huber LLP

(57) ABSTRACT

The invention concerns a control device for at least one heating, air-conditioning, ventilation or refrigeration system with a memory for a temperature control program and a signal outlet. It is endeavoured to simplify the programming. For this purpose, the memory is arranged in an element (5), which comprises a communication interface (6) and which can be dismounted from the control device, the communication interface (6) being connectable to an external input device and the control device (1) comprising an electrical supply device (3) which can transmit electrical energy to the element (5).

15 Claims, 1 Drawing Sheet

CONTROL DEVICE FOR AT LEAST ONE HEATING, AIR-CONDITIONING, VENTILATION OR REFRIGERATION SYSTEM

CROSS REFERENCE TO RELATED APPLICATION

Applicant hereby claims foreign priority benefits under U.S.C. §119 from German Patent Application No. 10 2008 018 588.4 filed on Apr. 12, 2008, the contents of which are incorporated by reference herein.

FIELD OF THE INVENTION

The invention concerns a control device for at least one heating, air-conditioning, ventilation or refrigeration system with a memory for a temperature control program and a signal outlet.

BACKGROUND OF THE INVENTION

In the following, the invention will be described on the basis of a heating system with a radiator. However, in principle, it can be used in the same manner with a refrigeration system, in which a heat exchanger is supplied with a cooled fluid, to adopt heat from the environment, or with a ventilation system, which controls different amounts of air on the basis of a program. Also the use in an air-conditioning system is possible, in which further parameters can be influenced on the basis of a program.

Basically, radiators have radiator valves. In this case, it is also common for the radiator valves to be controlled by a thermostatic top part. Recently, this control has been extended in that the desired value of the thermostatic top part can be changed on the basis of a program. For this purpose, the thermostatic top part comprises, for example, a small electric motor, which changes the position of a thermostatic element inside the thermostatic top part or directly moves a valve element. With such a heating device, a temperature program can then be processed, with which for example the room temperature during the night is reduced by a few degrees and during the day is increased by a few degrees. With more expensive controls, also weekdays can be considered in the temperature program, so that the night setback starts at a later time during weekends than during workdays. The user has a relatively large freedom for programming the heating device.

However, this freedom has the disadvantage that the programming is rather strenuous for the user.

SUMMARY OF THE INVENTION

The invention is based on the task of simplifying the programming.

With a control device as mentioned in the introduction, this task is solved in that the memory is arranged in an element, which comprises a communication interface and which can be dismounted from the control device, the communication interface being connectable to an external input device and the control device comprising an electrical supply device which can transmit electrical energy to the element.

With this embodiment, it is no longer necessary to perform the programming directly at the radiator or at another unit having signal connection to the radiator. The element comprising the memory can be dismounted form the control device and connected to the external input device. The external input device permits a higher comfort level during entry of temperature control program. When the programming has been finished, that is, the data for the temperature control program have been put in and stored in the memory, the connection between the element and the input device can be detached again, and the element is inserted in the control device again. In this position, electrical energy is transferred to the element, so that the element and its complete electronics receive sufficient energy supply to work according to purpose. The external input device does not have to go on working and can be disconnected.

Preferably, the external input device is made as a computer, particularly a personal computer. A personal computer, which can also be made as a laptop, a notebook or the like, is available to many users. Then, the element can be connected to the computer, for which purpose the communication interface can be used, the data for the temperature control program can be put in and the element can be refitted into the control device. With a computer that is provided with a keyboard, a mouse or another input device and a screen, the input of data is relatively easy to do.

It is preferred that the memory contains a program that can be executed by the computer, by means of which the data for the temperature control program can be put in. The executable program can, for example, show masks on the screen of the computer, in which the user can put in his desired data. For example, the user can put in the times, between which the desired temperature shall be achieved. When the program has been stored in the memory of the element, this program does not have to be installed on the computer in advance. After removing the element from the computer, if desired, it can no longer be seen that the program has been executed on the computer.

Preferably, the element has an adjustable clock. The clock can, for example, be adjusted, when the element is connected to the computer. In an extended version, the term "clock" also comprises a complete calendar, so that also Sundays and holidays and the automatic conversion between summertime and wintertime can be considered when registering the data of the temperature control program.

Preferably, the communication interface is made as a USB interface. A USB interface (Universal Serial Bus) is available in many computers. A USB interface is not only able to transfer data from the element to the computer and vice versa. It is usually also able to transfer electrical current from the computer to the element, so that the element is supplied with electrical operation energy, when connected to the computer.

Preferably, the communication interface is connectable to the electrical energy supply device for the transfer of electrical energy. When the element is inserted in the control device, it is automatically connected to the electrical energy supply device, so that the electrical energy supply device can currently supply the electrical energy required for the operation. This is particularly simple with a USB interface.

Preferably, the element has a transmitter device for a wireless signal transmission, which is connected to the signal outlet. If a transmitter device is used, a mechanical or wired connection between the control device and the radiator valve activated by the control device is no longer required. The control device is even able to control several radiator valves at a time, which is particularly advantageous, when several radiator valves are to be controlled in the same way. When individual radiators with their thermostatic top parts can be addressed, the control device is also able to execute different temperature control programs for different radiators. Also these different temperature control programs can then be put in by means of the external input device. The transmission arrangement has, for example, a sender and an antenna. For the wireless signal transmission, for example, a "Z-wave" system can be used, which is available from the company Zensys A/S, 2100 Copenhagen, Denmark. Of course, also other transmission systems are possible.

Preferably, the element is insertable in a housing, in which the electrical energy supply device is located. On the one hand, the housing offers a certain protection; on the other hand it puts together the electrical supply device and the element in the operational state. The risk that external forces can cause damage, for example in the area of the connection between the electrical supply device and the element, is relatively small.

It is preferred that the housing comprises at least one activation element, which can be operated from the outside. In many cases it may be desired to override the temperature control program. For example, it is desired to deactivate the night setback, if friends have come in for the evening, or it is desired to cause an additional setback of the temperature, when a room is left for a long period. The activation element that is accessible from the outside has been provided for this purpose.

It is preferred that the activation element interacts with an activation device in the element. Thus, the activation element in the housing merely has the function of a mechanical transfer. The change of the operation state then occurs through the effect of the activation device in the element, which again is activated by the activation element.

BRIEF DESCRIPTION OF THE DRAWINGS

In the following, the invention is described on the basis of a preferred embodiment in connection with the drawings, showing.

DETAILED DESCRIPTION OF THE PREFERRED EMBODIMENTS

Figure 1:
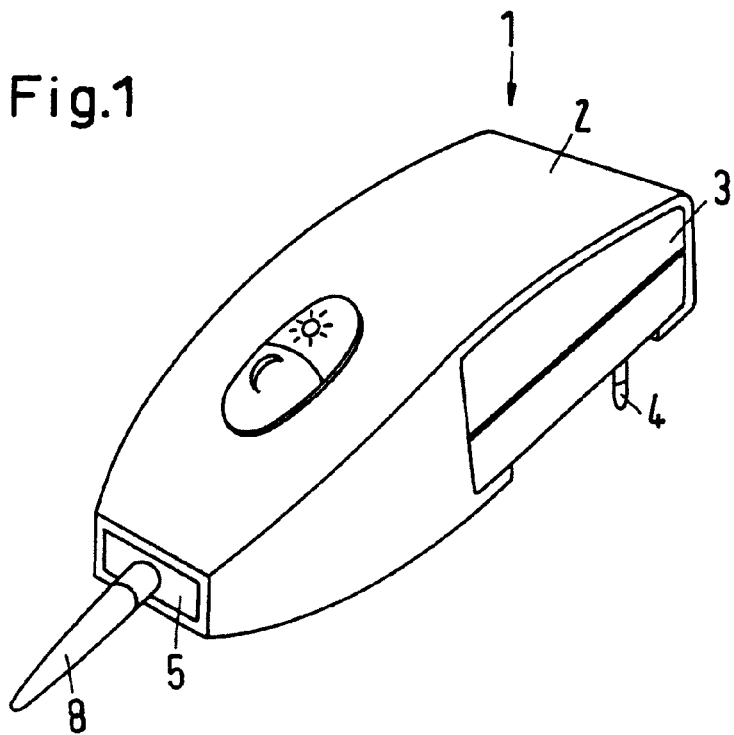
FIG. 1 is a control device from the outside.

FIG. 1 shows a control device 1 for a heating, air-conditioning, ventilation or refrigeration system that is not shown in detail.

The control device 1 has a housing 2, in which an energy supply device 3 is arranged, which can be connected via an electrical connection cable 4 to, for example, a plug box of a domestic electrical installation.

The housing 2 further comprises an element 5 that (FIG. 2) comprises a USB plug 6, which can be inserted in a USB bushing 7 of the electrical energy supply device 3, when the element 5 is in the position shown in FIG. 1, that is, inserted in the housing 2.

When the element 5 is arranged in the housing 2 and the USB plug 6 is inserted in the USB bushing 7, the electrical energy supply 3 is able to supply the element 5 with the required electrical operation voltage, which is required for its operation. In this state the USB interface formed by means of the USB plug 6 and the USB bushing 7 is not required for any further tasks.

The element 5 has an antenna 8, which is connected to a sender that is arranged inside the element 5. The antenna 8 and the sender form a transmission device, for example in accordance with the "Z-wave" system of the company Zensys A/S, Copenhagen, Denmark. Via the antenna 8, the element 5 can send signals to valve control devices, which are arranged at radiators or refrigeration systems, to adjust these valves or to specify desired values by remote control.

Figure 2:
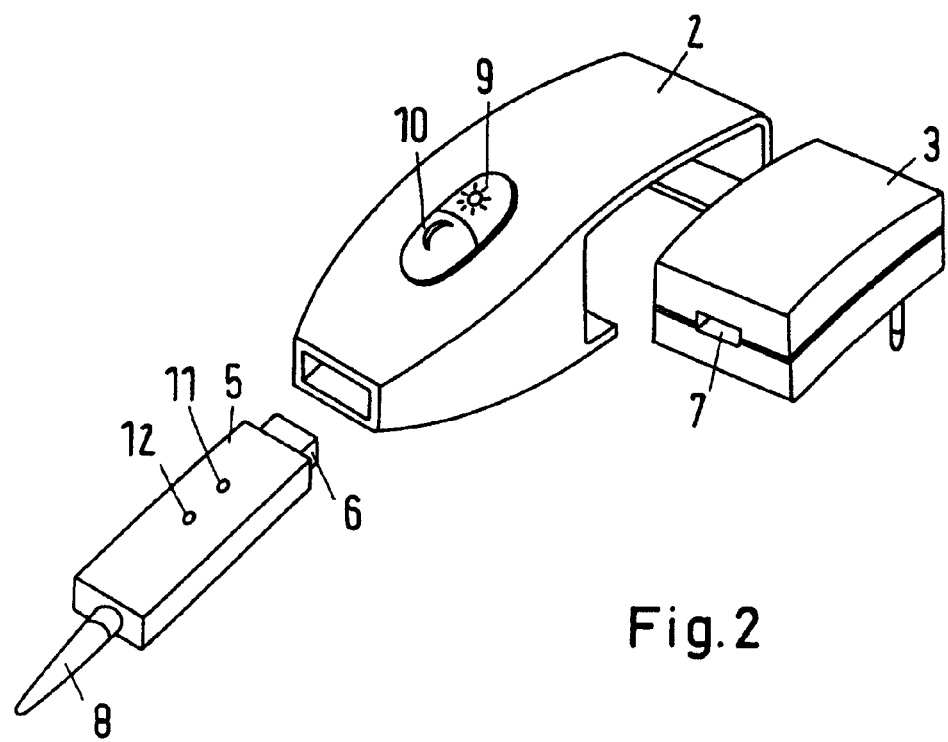
FIG. 2 is a control device with essential elements in the disassembled state.

When the element 5 has, as shown in FIG. 2, been removed from the housing 2, its USB plug 6 can be inserted in a USB interface of a computer (not shown in detail), for example a personal computer. As soon as it has been inserted here, a program that is stored in the element 5 will be executed by the computer. In this connection, input masks will be shown, in which the user can put in data for his desired temperature profile. For example, he can put in the periods, in which he wants night setback, and the related temperature. The computer can transfer the time and the weekday in question to the element 5. This transfer can take place automatically, without requiring an activity from the user.

The memory contained in the element 5 can of course comprise a standard program that can be executed in the control device 1, when the user has not put in his own temperature control program.

When the desired programming has been finished, the element 5 is removed from the computer and fitted in the housing 2. The element 5 can then control the desired thermostats autonomously.

As can be seen from FIG. 2, the housing 2 is made to be C-shaped, the electrical energy supply device 3 being inserted laterally in the housing and locked by the insertion of the element 5 by means of a leg of the "C". This gives the compact embodiment shown in FIG. 1.

The housing 2 has two additional keys 9, 10, which serve as activation elements. Instead of keys 9, 10, of course also other activation elements can be used. Via openings 11, 12, these keys act into the element 5. The openings 11, 12 can also be closed by membranes or the like, so that the inside of the element 5 is still closed. The keys 9, 10 merely have a mechanical transfer function. Inside the element 5, activation devices are then available, which change the operational behaviour of the element 5. For example, the key 9 can be used to override the night setback and the key 10 to override the day temperature.

Also battery operation of the unit could be imagined. In principle, the housing 2 is not needed, if the element 5 can be completely inserted in the energy supply device 3.

The keys 9, 10 can also be remote-controlled, so that no physical keys have to be available on the outside.

Also imaginable is a communication with the element 5 via a different medium, for example, an infrared connection, so that an override or change of the settings could, for example, be made by means of a handy.

The element 5 could, for example, also receive information from a wirelessly acting thermostat arranged in the room.

Expediently, also a small battery (or a different kind of energy supply) could be provided in the element 5, so that it is ensured that the data put in do not disappear, when the element 5 is removed from the energy supply device 3 or from the computer.

The element 5 can of course also be used, when it is inserted in the computer. In this case, however, the computer should always be turned on.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A control device for at least one heating, air-conditioning, ventilation or refrigeration system with a memory for a temperature control program and a signal outlet, wherein the memory is arranged in an element, which comprises a communication interface and which can be dismounted from a housing of the control device, the communication interface being connectable to an external input device and the control device comprising an electrical supply device which can transmit electrical energy to the element.

2. The control device according to claim 1, wherein the external input device is a computer, and wherein the communication interface is adapted to be received in a USB interface of the computer.

3. The control device according to claim 2, wherein memory contains a program that can be executed by the computer, by means of which the data for the temperature control program can be put in.

4. The control device according to claim 1, wherein the element has an adjustable clock.

5. The control device according to claim 1, wherein the communication interface is made as a USB interface.

6. The control device according to claim 1, wherein the communication interface is connectable to the electrical energy supply device for the transfer of electrical energy.

7. The control device according to claim 1, wherein the element has a transmitter device for a wireless signal transmission, which is connected to the signal outlet.

8. The control device according to claim 1, wherein the element is insertable in a housing, in which the electrical energy supply device is located.

9. The control device according to claim 8, wherein the housing comprises at least one activation element, which can be operated from the outside.

10. The control device according to claim 9, wherein the activation element interacts with an activation device in the element.

11. A control device for at least one heating, air-conditioning, ventilation or refrigeration system, the control device comprising:
  a housing;
  an electrical supply device arranged within the housing; and
  an element adapted to be mounted in the housing and dismounted therefrom, the element including a memory for a temperature control program disposed therein, a signal outlet for transmitting signals to the at least one heating, air-conditioning, ventilation or refrigeration system, and a communication interface;
  wherein the communication interface is connectable to the electrical supply device when the element is mounted in the housing to transmit electrical energy to the element and connectable to an external input device when the element is dismounted from the housing.

12. The control device according to claim 11, wherein the housing comprises at least one activation element disposed therein, which can be operated from the outside of the housing.

13. The control device according to claim 12, wherein the activation element mechanically interacts with an activation device in the element.

14. The control device according to claim 11, wherein the element is insertable in the housing.

15. The control device according to claim 14, wherein the communication interface is a USB interface and wherein the electrical supply device includes a USB bushing with which the communication interface interacts when the element is inserted in the housing.

* * * * *